US011218057B2

(12) United States Patent
Latulipe et al.

(10) Patent No.: US 11,218,057 B2
(45) Date of Patent: Jan. 4, 2022

(54) ELECTRIC MACHINE PROVIDED WITH AN ENCLOSED COOLING ASSEMBLY PAIRED TO AN OPEN COOLING ASSEMBLY

(71) Applicant: DANA TM4 INC., Boucherville (CA)

(72) Inventors: Eric Latulipe, Ste-Julie (CA); Yannick Philibert, Boucherville (CA); Jean-Philippe Dextraze, Delson (CA); Martin Houle, Laval (CA); Jean-Philippe Desbiens, Saint-Bruno de Montarville (CA); Mathieu Lepage, Montreal (CA); Francois Dube, Montreal (CA)

(73) Assignee: DANA TM4 INC., Boucherville (CA)

( * ) Notice: Subject to any disclaimer, the term of this patent is extended or adjusted under 35 U.S.C. 154(b) by 182 days.

(21) Appl. No.: 16/464,745

(22) PCT Filed: Nov. 27, 2017

(86) PCT No.: PCT/CA2017/051421
§ 371 (c)(1),
(2) Date: May 29, 2019

(87) PCT Pub. No.: WO2018/098567
PCT Pub. Date: Jun. 7, 2018

(65) Prior Publication Data
US 2019/0312488 A1    Oct. 10, 2019

Related U.S. Application Data

(60) Provisional application No. 62/427,480, filed on Nov. 29, 2016.

(51) Int. Cl.
*H02K 9/19* (2006.01)
*H02K 5/04* (2006.01)
(Continued)

(52) U.S. Cl.
CPC ................. *H02K 9/19* (2013.01); *B60K 1/00* (2013.01); *B60K 11/02* (2013.01); *F04C 2/102* (2013.01);
(Continued)

(58) Field of Classification Search
CPC .. H02K 9/19; H02K 5/20; H02K 9/20; H02K 3/24; H02K 9/10; H02K 1/32; H02K 1/20;
(Continued)

(56) References Cited

U.S. PATENT DOCUMENTS 7,948,125 B2 * 5/2011 Woody ................. H02K 9/19
                                                          310/54
8,169,110 B2 * 5/2012 Swales ................. H02K 11/048
                                                          310/54
(Continued)

FOREIGN PATENT DOCUMENTS

CN    101965467 A    2/2011
CN    103038983 A    5/2011
(Continued)

OTHER PUBLICATIONS

China National Intellectual Property Administration, Office Action and Search Report Issued in Application No. 201780073832.8, dated Aug. 21, 2020, 14 pages.
(Continued)

*Primary Examiner* — Tulsidas C Patel
*Assistant Examiner* — Riley Owen Stout
(74) *Attorney, Agent, or Firm* — McCoy Russell LLP

(57) ABSTRACT

An electric machine is described herein. The electric machine includes a casing, a stator, a rotor generally coaxial with the stator, an enclosed cooling assembly circulating a first cooling fluid within the casing, and an open cooling assembly through which a second cooling assembly can
(Continued)

flow; the open cooling assembly cooling both the stator and the first cooling fluid.

21 Claims, 10 Drawing Sheets

(51) Int. Cl.
    *H02K 5/20*         (2006.01)
    *H02K 9/24*         (2006.01)
    *F04C 2/10*         (2006.01)
    *B60K 11/02*       (2006.01)
    *B60K 1/00*        (2006.01)

(52) U.S. Cl.
    CPC ............... *H02K 5/04* (2013.01); *H02K 5/20* (2013.01); *H02K 9/24* (2013.01); *F01P 2050/24* (2013.01)

(58) Field of Classification Search
    CPC ............ H02K 9/005; H02K 9/12; H02K 9/04; H02K 9/14; H02K 5/04; H02K 9/24; B60K 11/02; B60K 1/00; F04C 2/102; F01P 2050/24
    USPC .................................. 310/52–53, 57–59, 89
    See application file for complete search history.

(56) References Cited

U.S. PATENT DOCUMENTS

| | | | | |
|---|---|---|---|---|
| 8,653,703 | B2* | 2/2014 | Kori | H02K 9/10 310/54 |
| 9,000,632 | B2* | 4/2015 | Matsuki | H02K 5/20 310/54 |
| 2008/0073984 | A1* | 3/2008 | Down | H02K 9/19 310/53 |
| 2011/0011203 | A1 | 1/2011 | Yamamoto et al. | |
| 2011/0084561 | A1 | 4/2011 | Swales et al. | |
| 2013/0342045 | A1 | 12/2013 | Matsuki et al. | |

FOREIGN PATENT DOCUMENTS

| | | |
|---|---|---|
| CN | 102208845 A | 10/2011 |
| CN | 103038983 A | 4/2013 |
| CN | 103161727 A | 6/2013 |
| CN | 104797369 A | 7/2015 |
| DE | 102012022873 A1 | 5/2014 |
| DE | 102014216693 A1 | 2/2016 |
| EP | 2372881 A2 | 10/2011 |
| JP | 2007325436 A | 12/2007 |

OTHER PUBLICATIONS

European Patent Office, Extended European Search Report Issued in Application No. 17875968.4, dated Jun. 8, 2020, Germany, 10 pages.

* cited by examiner

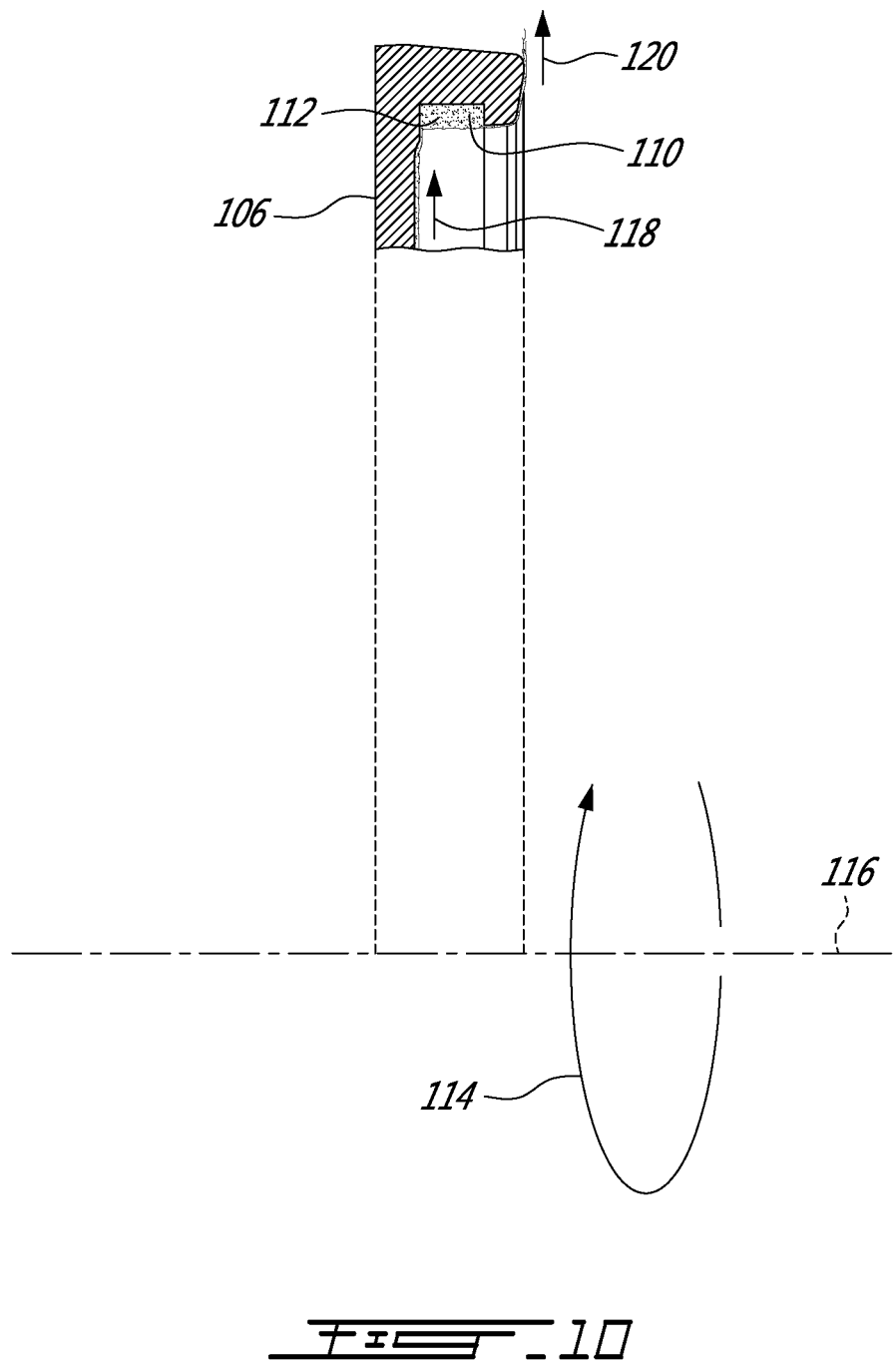

ELECTRIC MACHINE PROVIDED WITH AN ENCLOSED COOLING ASSEMBLY PAIRED TO AN OPEN COOLING ASSEMBLY

FIELD

The present disclosure relates to electric machines. More specifically, the present disclosure is concerned with an electric machine provided with an enclosed cooling assembly paired to an open cooling assembly.

BACKGROUND

Electric machines, motors or generators, are well known in the art. It is also widely known that electric machines generate heat as a by-product and that this heat must be somehow extracted from the machine to improve the performance of the machine and/or prevent early degradation or failure thereof.

Electric machines are often air-cooled. This is generally done by providing apertures in the body of the machine to force air therethrough. The efficiency of such a cooling arrangement is mostly poor since air is an usually low efficiency cooling fluid. Furthermore, some electric machines operate in environments that are such that it is not possible to provide apertures to allow air therein. Accordingly, liquid cooling arrangements for electric machines have been designed.

BRIEF DESCRIPTION OF THE DRAWINGS

In the appended drawings:

FIG. 10 is a sectional view taken along line 10-10 of FIG. 9.

DETAILED DESCRIPTION

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "rear", "upwardly", "downwardly", etc. is used. It is to be understood that such terminology is used for ease of description and in a relative sense only and is not to be taken in any way as a limitation upon the scope of the present disclosure.

Further, in this specification, the terms "axial direction", "axially", "axial", and the like, refer to the direction of the rotation axis of the rotor, the direction of the central axis of the cylindrical stator, and the directions corresponding to them, the terms "radial direction", "radially", "radial", and the like, refer to the directions perpendicular to such axial directions, and the terms "circumferential direction", "circumferentially", "circumferential", and the like, refer to each direction along the circumference of a circle drawn about a given point of the rotation axis on a plane perpendicular to the rotation axis.

The expression "connected" should be construed herein and in the appended claims broadly so as to include any cooperative or passive association between mechanical parts or components. For example, such parts may be assembled together by direct coupling, or indirectly coupled using further parts. The coupling can also be remote, using for example a magnetic field or else.

Other objects, advantages and features of the electric machine provided with an enclosed cooling assembly paired to an open cooling assembly will become more apparent upon reading of the following non-restrictive description of illustrative embodiments thereof, given by way of example only with reference to the accompanying drawings.

Figure 1:
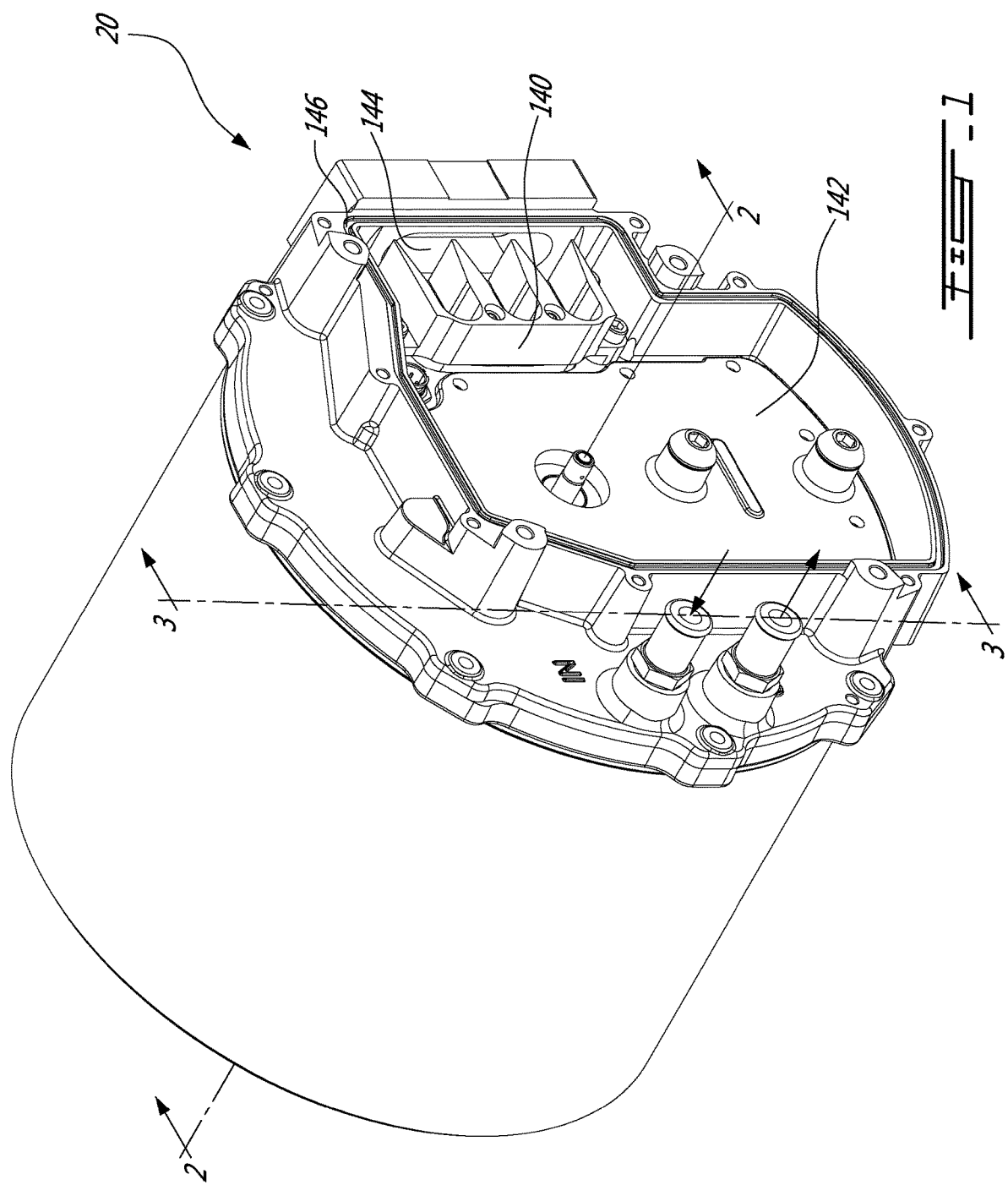
FIG. 1 is a perspective view of an electric machine according to an illustrative embodiment.

FIG. 1 is a perspective view of an electric machine 20 provided with an enclosed cooling assembly paired to an open cooling assembly.

Figure 2:
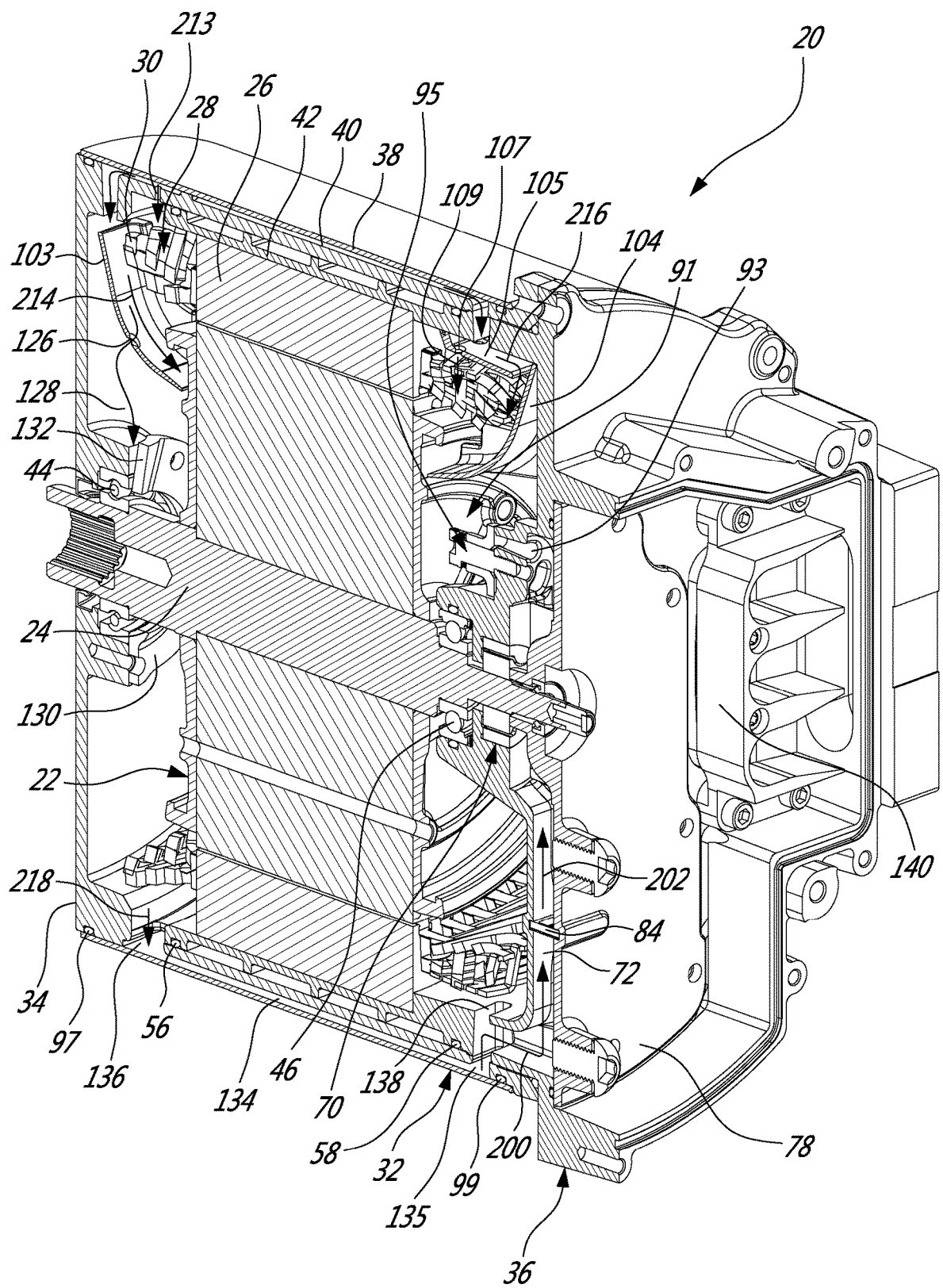
FIG. 2 is a sectional view taken along line 2-2 of FIG. 1.

As can be better seen from FIG. 2, the electric machine 20 includes a central rotor 22 mounted to a shaft 24, a stator 26 provided with coils 28 (only the heads 30 of the coils are shown) and a casing 32 including a front plate 34, a back plate assembly 36 and a wall assembly including an outer wall 38, an intermediate wall 40 and an inner wall 42. An internal compartment of the casing 32 is generally defined by the front and back plates 34, 36 and by the inner wall 42.

It is to be noted that in the illustrated embodiment, the front plate 34 and the intermediate wall 40 are integral and the inner wall 42 is part of the back plate assembly 36.

The shaft 24 is mounted to the front plate 34 via a bearing 44 and to the back plate assembly 36 via a bearing 46.

Figure 3:
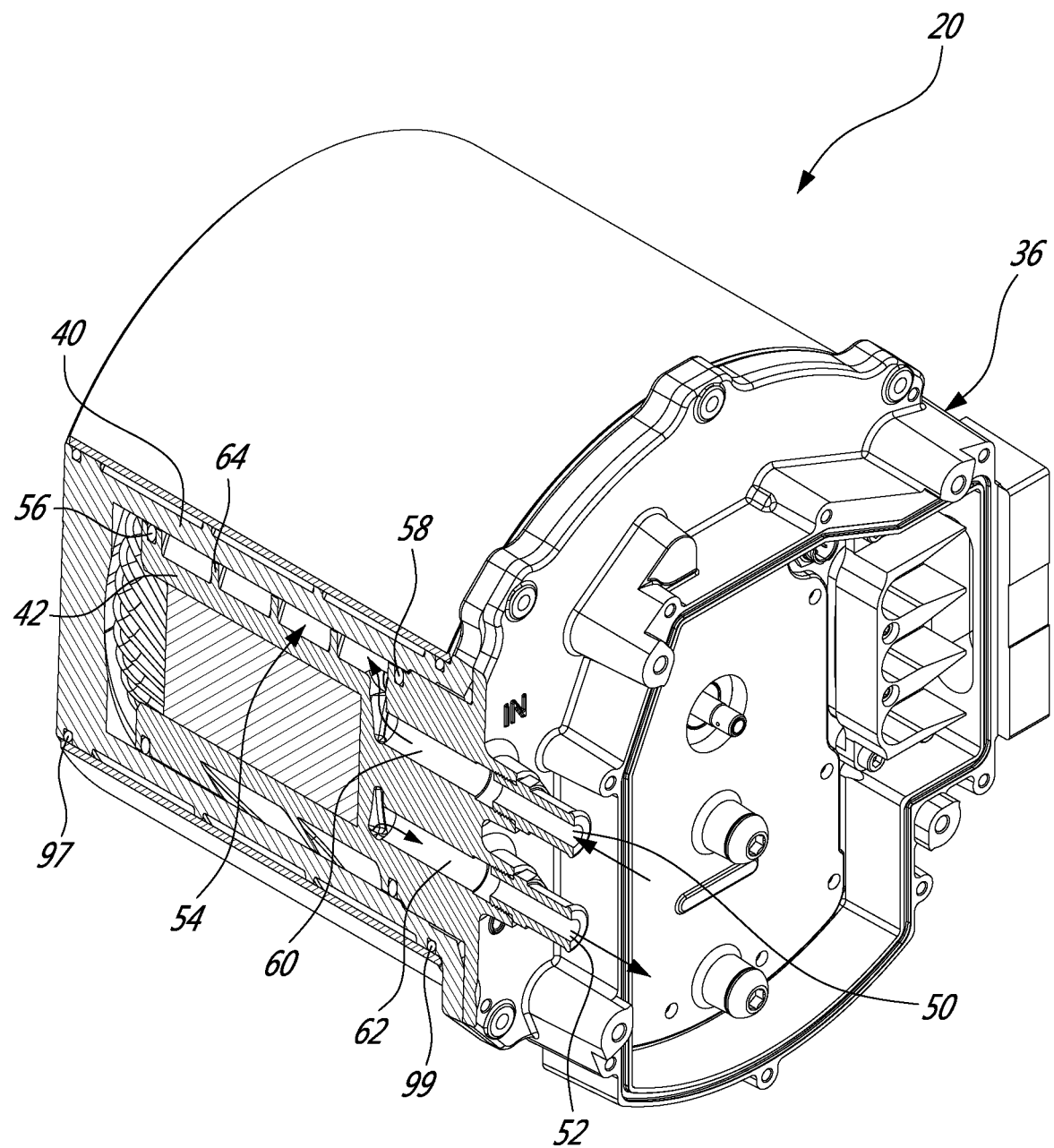
FIG. 3 is a sectional view taken along line 3-3 of FIG. 1.
Figure 7:
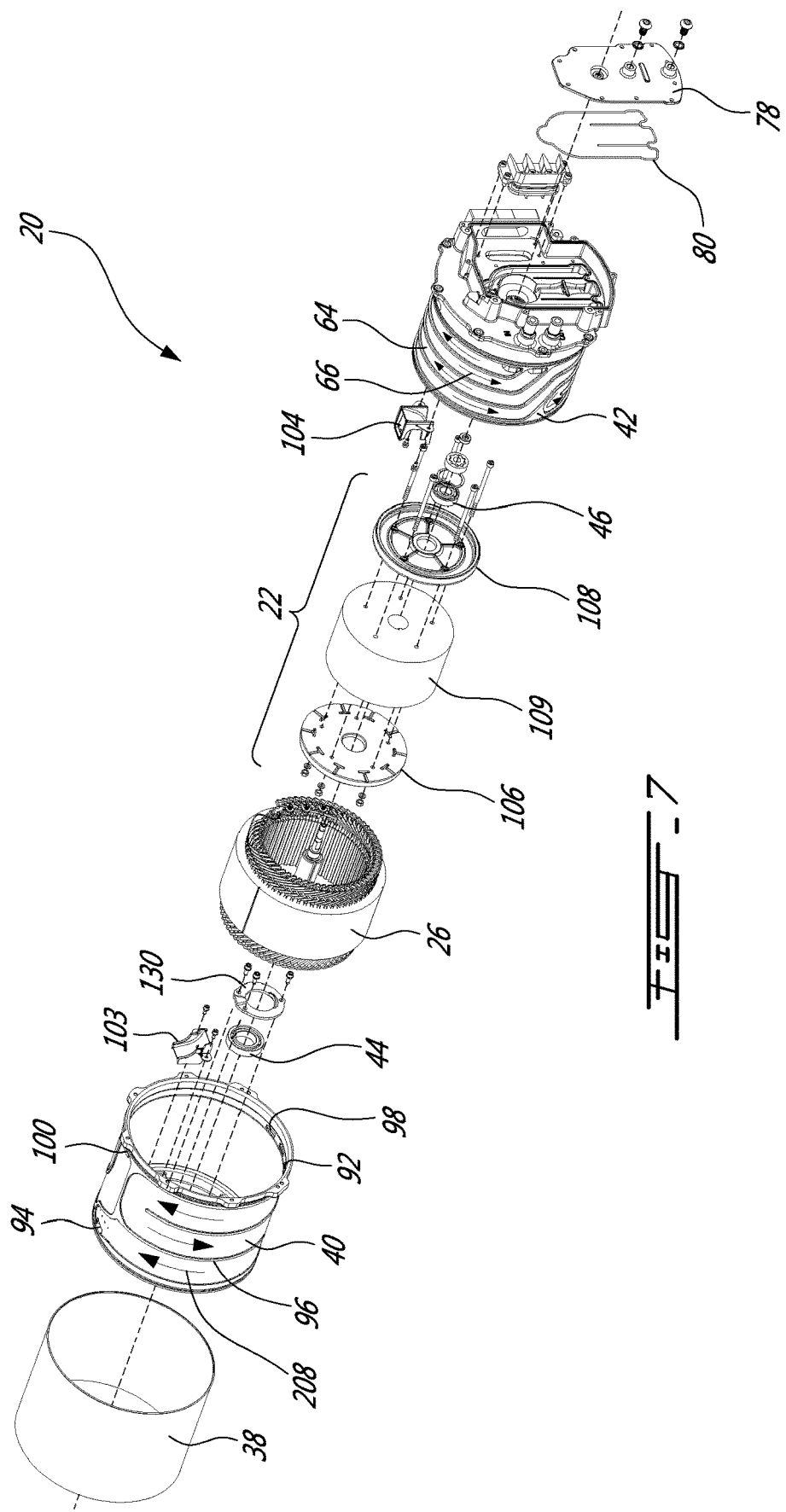
FIG. 7 is an exploded view of the electric machine of FIG. 1 shown from the back thereof.
Figure 8:
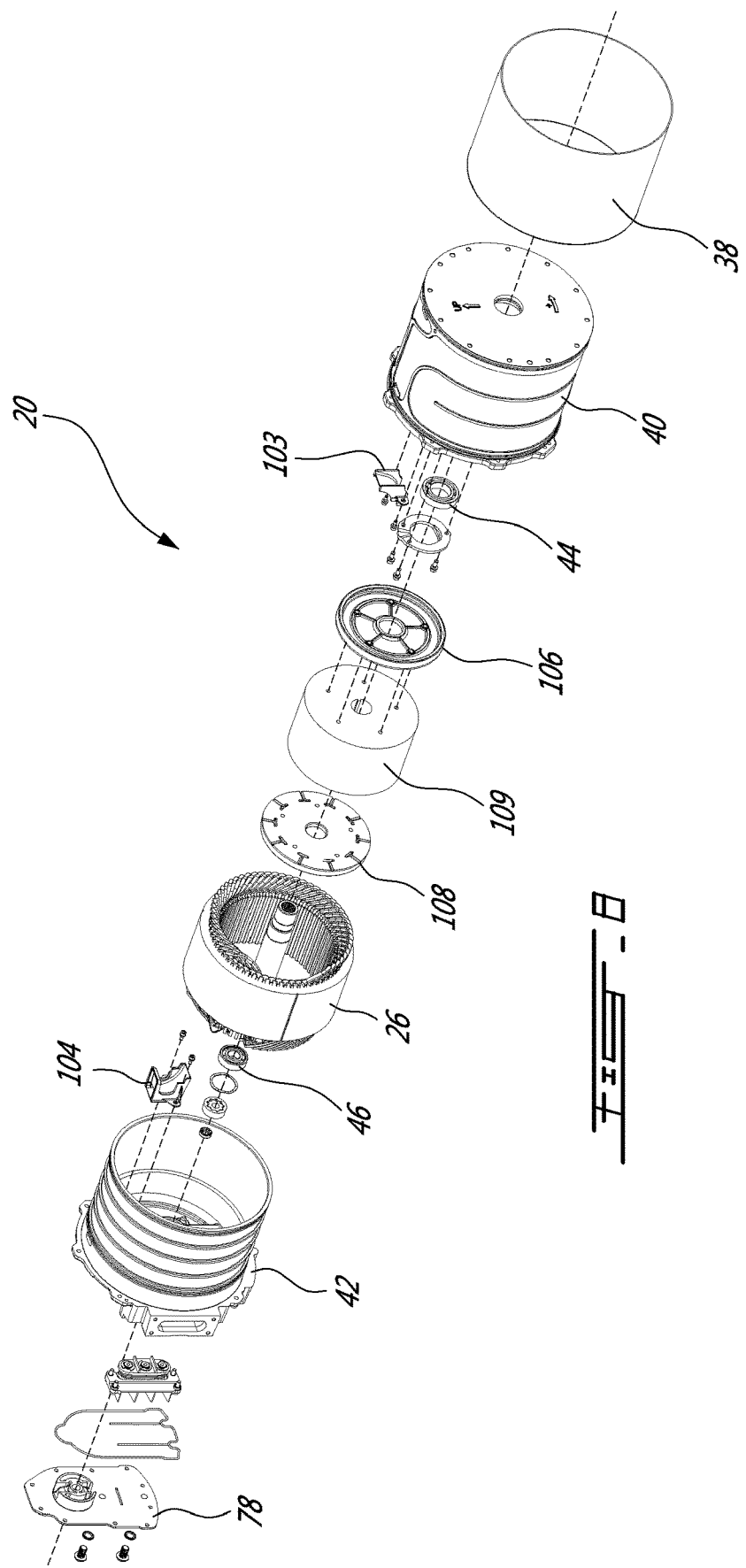
FIG. 8 is an exploded view of the electric machine of FIG. 1 shown from the front thereof.

Turning now to FIGS. 2, 3 and 7, the open cooling assembly of the electric machine 20 will be described.

The open cooling assembly includes an inlet 50, an outlet 52 and a cooling path 54 provided between the inner wall 42 and the intermediate wall 40. As can be seen from FIG. 3, the back assembly 36 includes channels 60 and 62 respectively linking the inlet 50 and the outlet 52 to the cooling path 54.

As can be better seen from FIG. 7, inner wall 42 includes projections 64 facing the intermediate wall 40 and defining the path of the flow of cooling fluid (see arrow 66).

In order to have the inlet 50 and the outlet 52 of the open cooling assembly on the same side of the electric machine 20, the projections 64 define a double-helix configuration of the cooling path of the cooling fluid. Of course, one skilled in the art would be in a position to design other projection topologies to generate a desired cooling path.

To ensure that the cooling fluid flowing in the open cooling assembly stays in its cooling path 54, seals in the form of O-rings (see 56 and 58 in FIGS. 2 and 3) are provided between the inner wall 42 and the intermediate wall 40.

The cooling fluid flowing in the open cooling assembly is pumped by an external source (not shown) and is cooled by an external mechanism (also not shown), for example the conventional pump and radiator of a vehicle. This cooling fluid may be, for example a water ethylene glycol mixture.

One skilled in the art will understand that the position of the cooling path between the inner and intermediate walls allows the cooling fluid flowing therethrough to cool the stator 26, which is in contact with the internal surface of the inner wall 42 while also cooling the cooling fluid of the enclosed cooling assembly which flows between the inner wall and the outer wall as will be described hereinbelow.

Turning now to FIGS. 2 and 4 to 8, the enclosed cooling assembly of the electric machine 20 will be described. The enclosed cooling fluid is contained in the machine 20 and is cooled by the proximity of the open cooling fluid of the open cooling assembly as will be explained hereinbelow.

As will be described in greater details hereinbelow, the enclosed circuit cooling assembly includes a pump used to pump the enclosed circuit cooling fluid through a fluid cooling path where the enclosed circuit cooling fluid is cooled by being in the proximity of the cooling fluid of the open cooling assembly. The cooled enclosed circuit cooling fluid then enters the internal compartment of the casing 32 where it contacts the rotor 22 and the stator 26, therefore drawing heat therefrom, before entering a bottom reservoir where it is ready to be pumped again.

Figure 5:
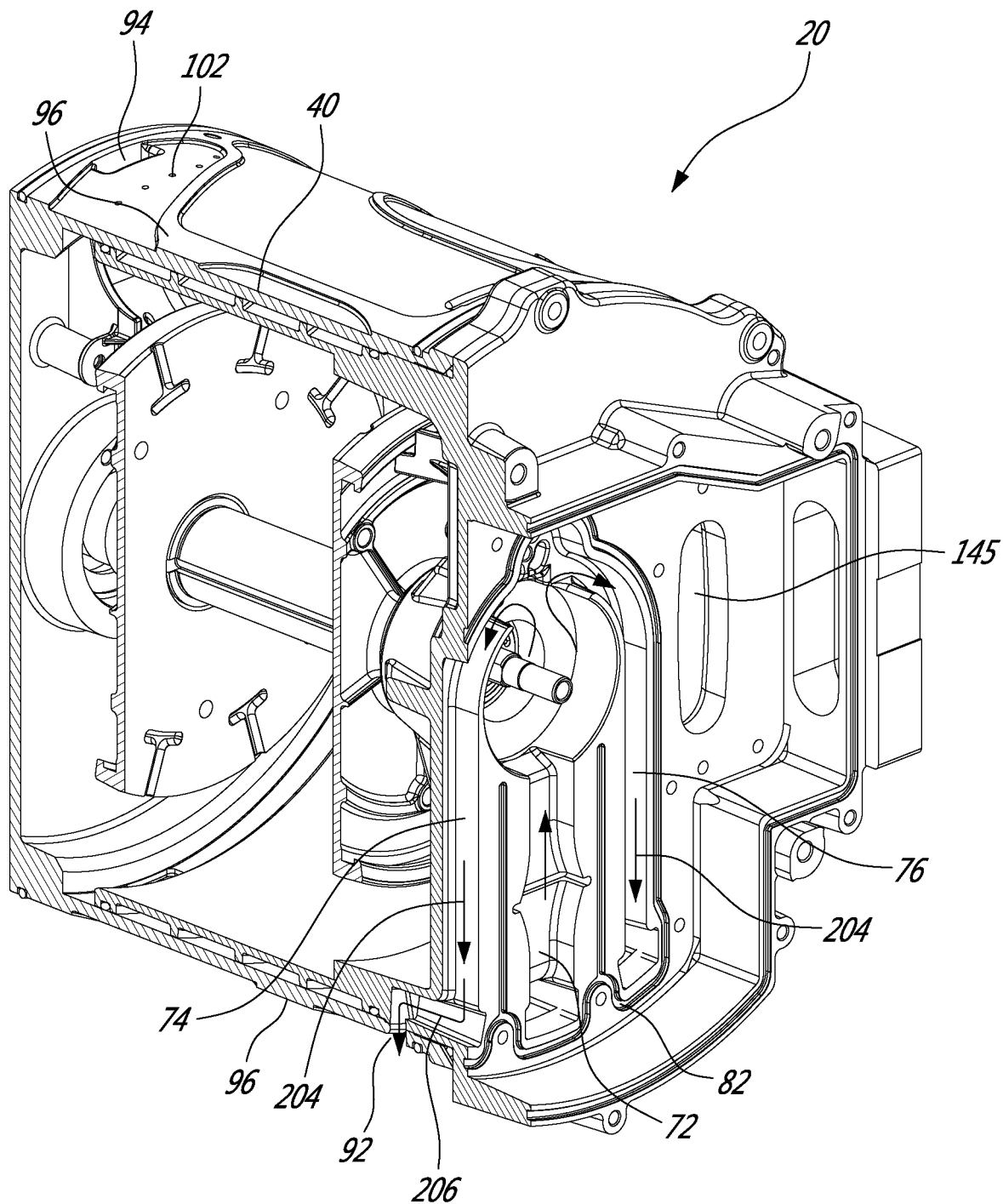
FIG. 5 is a sectional view illustrating one of the outlets of the pump.

More specifically, the enclosed cooling assembly includes a gerotor pump 70 (FIG. 6) provided in the back plate assembly 36. Since gerotor pumps are believed well known in the art, pump 70 will not be described in details herein. Suffice to say that the back plate assembly 36 includes a central inlet channel 72 for the pump 70 and two lateral outlet channels 74 and 76 (see FIG. 6). The channels are enclosed by a cover 78 sealed to the assembly 36 via a gasket 80 (FIG. 7) provided in a groove 82 (FIG. 5).

The inlet channel 72 allows cooling fluid to be pumped from a bottom reservoir as will be described hereinbelow.

Figure 6:
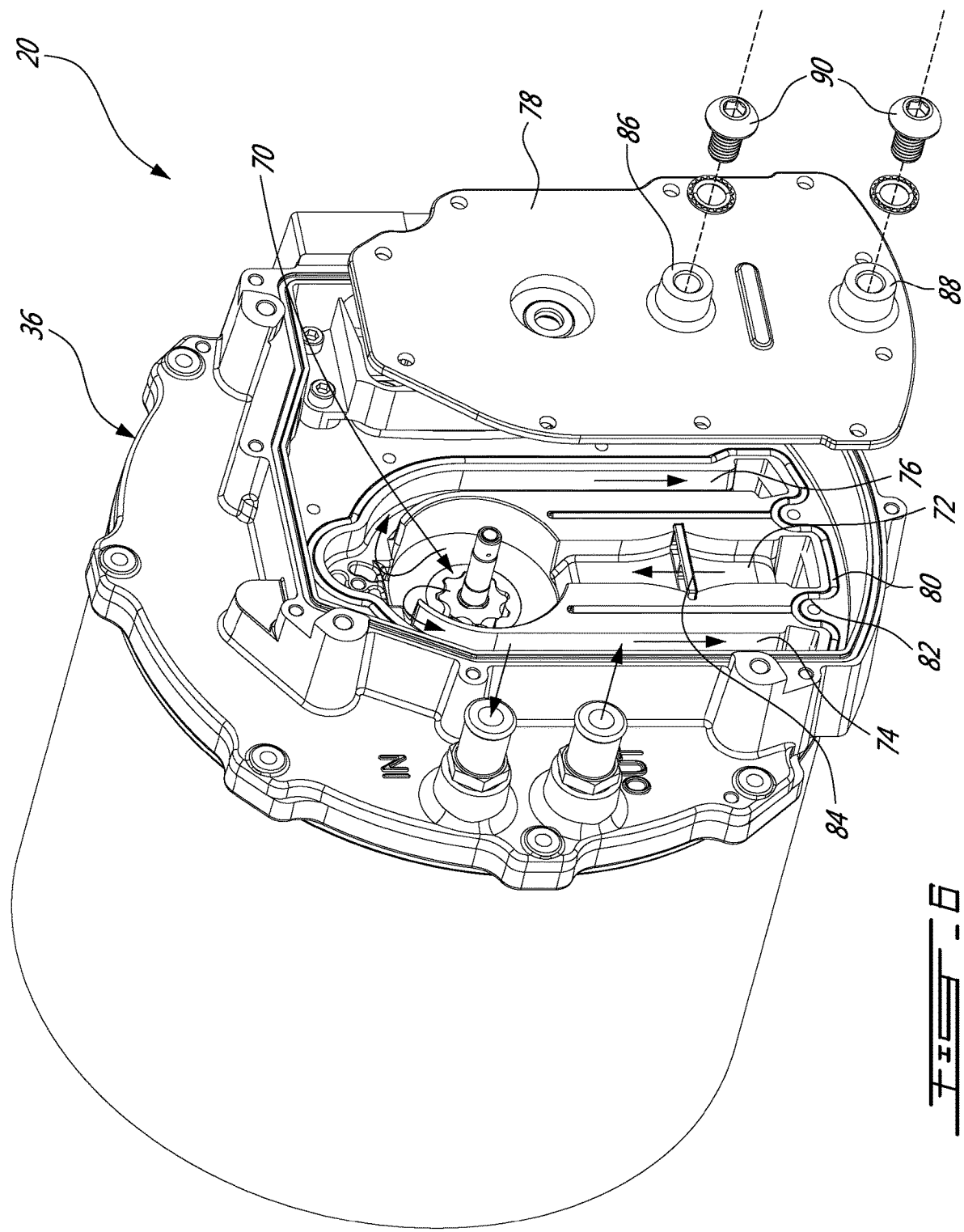
FIG. 6 is a perspective, partly exploded view similar to FIG. 1 where the pump cover is removed therefrom.

Turning briefly to FIG. 6, a filter 84 is provided in the inlet channel 72 to filter particles that may be present in the cooling fluid of the enclosed circuit cooling assembly. FIG. 6 also illustrates an inlet 86 and an outlet 88, closable by fasteners 90, used to fill and empty the cooling fluid when required.

Figure 4:
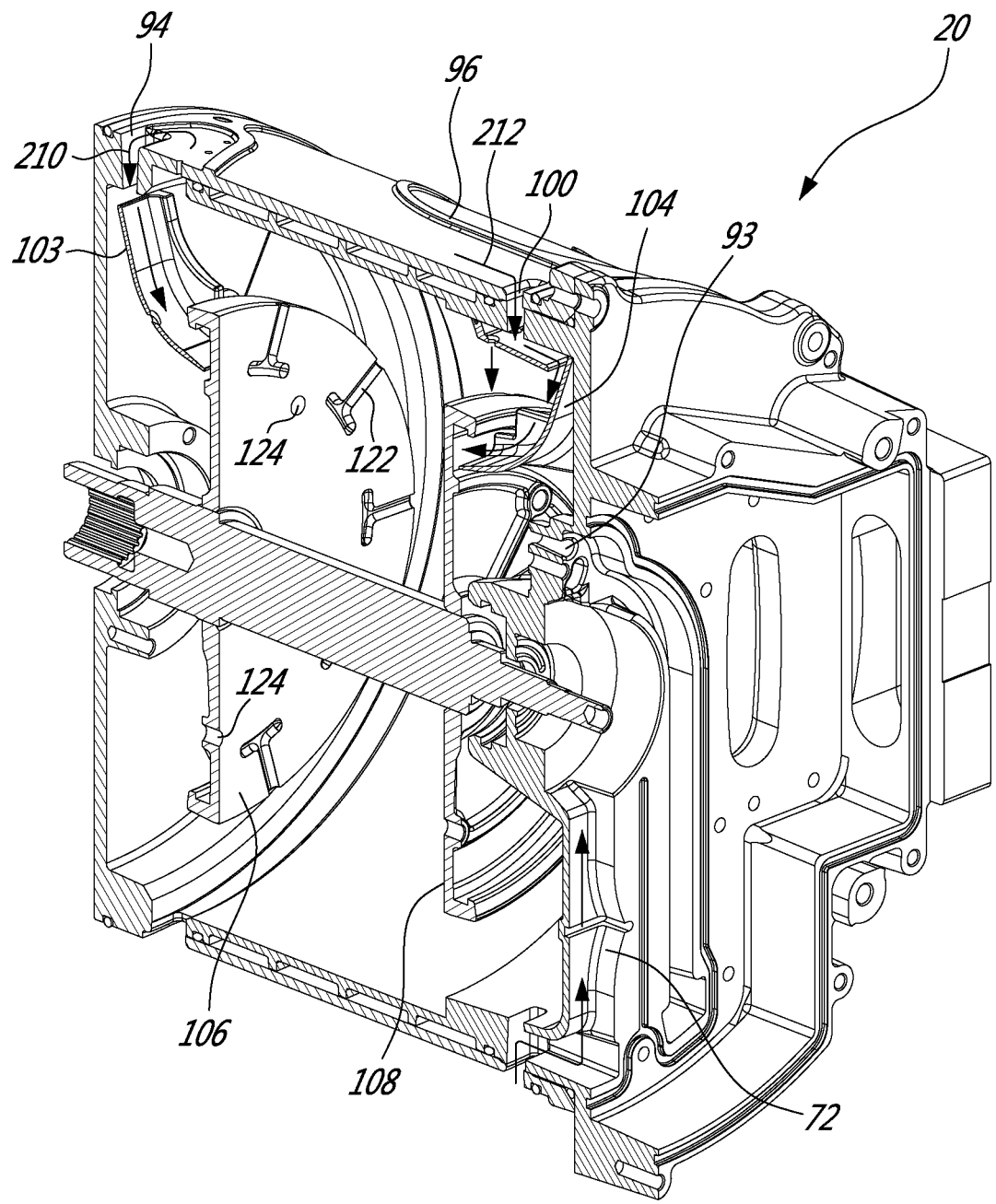
FIG. 4 is a sectional view similar to FIG. 2 where the stator, a portion of the rotor and the external wall of the casing are removed.

As can be better seen from FIGS. 2 and 4, the back plate assembly 36 includes a relief valve system 91 provided with apertures 93 in communication with the lateral outlet channels 74 and 76 and a pressure-relief mechanism 95 that opens if the pressure in the outlet channels is greater than a predetermined threshold. Accordingly, if the cooling fluid of the enclosed cooling assembly is cold and thick, causing the pressure to increase, the mechanism 95 opens and the cooling fluid is introduced in the casing, preventing damage to the cooling circuit, for example. Similarly, if the pump is rotating at high speed, the pressure may sufficiently increase as to cause the relief mechanism 95 to open.

The enclosed circuit cooling assembly includes two cooling paths both provided between the intermediate wall 40 and the outer wall 38. A first cooling path of the enclosed cooling assembly includes an inlet 92 (FIG. 5), associated with the outlet channel 74, and an outlet 94. The first cooling path is defined by projections 96 provided on the intermediate wall 40, facing the outer wall 38 (removed from FIG. 5 for clarity). Small apertures 102 are provided close to the outlet 94. These apertures 102 allow a portion of the enclosed circuit cooling fluid to reach the top stator coils head 30 outer side (see arrow 213 in FIG. 2), while the rest of the flow exits through outlet 94 to cool all of the coils head 30 inner side trough rotor centrifugal projection, as will be described hereinbelow.

The second cooling path of the enclosed cooling assembly includes an inlet 98 (FIG. 7), associated with the outlet channel 76, and an outlet 100 (FIG. 4). Again, the second cooling path is defined by projections 96 provided on the intermediate wall 40, facing the outer wall 38 (FIG. 2).

As can be seen from FIGS. 2 and 3, to ensure that the cooling fluid flowing in the enclosed cooling assembly stays in its cooling path, seals in the form of O-rings (see 97 and 99 in FIGS. 2 and 3) are provided between the outer wall 38 and the intermediate wall 40.

Since the intermediate wall 40 is cooled by the cooling fluid of the open cooling assembly described hereinabove, the cooling fluid of the enclosed circuit cooling assembly is cooled by the prolonged contact with the intermediate wall 40. Furthermore, the cooling fluid of the enclosed circuit cooling assembly is also cooled by the contact with the outer wall 38, itself in contact with the ambient air.

One skilled in the art will readily understand that the external surface of the casing could be provided with fins (not shown) to improve the convection cooling of the cooling fluid of the enclosed circuit cooling assembly.

As can be better seen from FIGS. 2 and 4, the enclosed circuit cooling assembly includes slides 103 and 104 respectively located under outlets 94 and 100. These slides guide the cooled cooling fluid onto the end plates 106 and 108 of the rotor 22. It is to be noted that the other elements forming the rotor 22 are omitted from FIG. 4.

Figure 9:
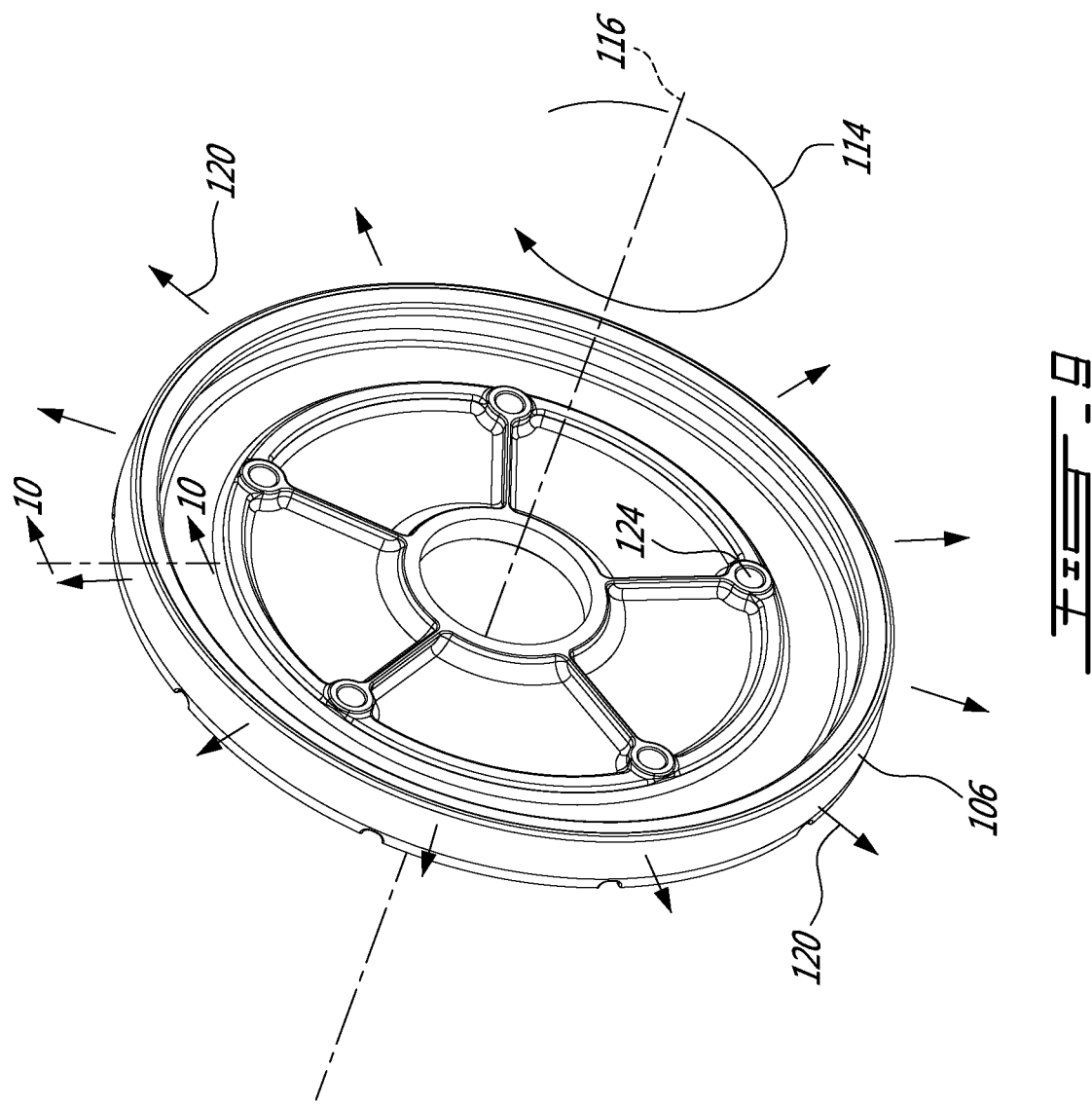
FIG. 9 is a perspective view of a rotor end plate.

Turning briefly to FIGS. 9 and 10, the role of the end plates 106 and 108 (only end plate 106 is shown in these figures) in the distribution of the cooling fluid of the enclosed circuit cooling assembly will be described.

The general idea is to distribute the cooled cooling fluid onto the heads 30, provided at both ends of the stator coils 28. Since the cooling fluid only enters the inside of the internal compartment of the casing 32 from the two outlets 94 and 100, the end plates 106 and 108 are configured to distribute the cooled cooling fluid outwardly towards the heads 30.

FIG. 10, which is a sectional view taken from FIG. 9, illustrates a peripheral generally U-shaped channel 110 designed to be filled with cooled cooling fluid 112 when the electric machine 20 is in operation, i.e. when the rotor 22 and thus the end plates 106 and 108 rotate (see arrow 114) about axis 116. Indeed, the forces acting on the cooled cooling fluid 112 upon rotation of the end plate 106 forces it in the channel 110 (see arrow 118). When the channel 110 is filled, it overflows outwardly and cooled cooling fluid is substantially evenly distributed onto the inner sides of the coil heads 30 (see arrows 120 in both FIGS. 9 and 10).

Returning briefly to FIG. 4, the T-shaped channels 122 provided on the inner surfaces of the end plates 106 and 108 are intended to allow trapped cooling fluid to egress the rotor 22. Indeed, cooling fluid could enter the laminations (schematically illustrated as 109 in FIGS. 7 and 8) forming the rotor 22 and become trapped therein.

The end plates 106 and 108 also include apertures 124 allowing the rotor to be assembled using bolts passing through the end plates and the laminations.

Returning to FIG. 2, the slide 103 includes an aperture 126 allowing some of the cooled cooling fluid to reach the bearing 44 (see arrow 128). Indeed, as can be seen from this figure, the bracket 130 mounting the bearing 44 to the front plate 34 includes a funnel portion 132 creating a small gap through which cooled cooling fluid can reach the bearing 44 to cool and lubricate the bearing.

Regarding the opposite bearing 46, oil seeping from the pump 70 through interstices between the pump and the back wall assembly 36 supplies enough cooling fluid for lubrication and cooling of this bearing 46.

FIG. 2 also shows that a deflector 105 is provided between the outlet 100 and the slide 104. Apertures 107 of this deflector allow a portion of the cooled cooling fluid to drip directly on the heads 30 of the coils 28 (see arrow 109) before returning on the slide 106.

After cooling the heads 30 of the coils 28 and the other elements of the electric machine 20, the now warmed cooling fluid, thanks to gravity, reaches the bottom of the internal compartment of the casing 32 and may enter a bottom reservoir 134 through apertures 136 and 138. It is to be noted that the reservoir 134, being provided between the outer wall 38 and the intermediate wall 40 helps in cooling the warmed cooling fluid since the intermediate wall 40 is cooled by the open cooling assembly and the external wall 38 is in contact with outside air, as described hereinabove.

As can be seen from FIG. 2, the inlet channel 72 is in communication with both the bottom reservoir 134, through an aperture 135, and the aperture 138. Accordingly, warmed cooling fluid is pumped from the reservoir 134 and directly from the internal compartment of the casing 32.

To recapitulate, the enclosed circuit cooling fluid is pumped from reservoir 134 through the inlet channel 72 via the apertures 135 and 138 (see arrow 200, FIG. 2) flows through the filter 84 (see arrow 202, FIG. 2), is pumped through the outlet channels 74, 76 (arrows 204, FIG. 5), enters the fluid cooling path via inlets 92 and 98 (see arrow 206, FIG. 5), is cooled by flowing in the fluid cooling path (see arrow 208, FIG. 7) before entering the internal compartment of the casing 32 via outlets 94 and 100 (see arrows 210, 212, FIG. 4). A portion of the cooling fluid of the enclosed cooling assembly is also evacuated from the path (see arrow 213, FIG. 2) through apertures 102 to reach the top coils head 30. The cooled cooling fluid then flows on the slide 103 (see arrow 214, FIG. 2) or in the deflector 105 before reaching the slide 104 (see arrow 216, FIG. 2) before being projected onto the head 30 of coils 28 by the rotation of the rotor and of its attached plates 106, 108 (see arrows 120, FIG. 9). Some of the cooled cooling fluid reaches the bearing 44 from the slide 103 (see arrow 128, FIG. 2) and some reach the heads 30 directly from the deflector 105 (see arrow 107, FIG. 2). When the cooling and lubricating functions have been performed, the then warm cooling fluid reaches the bottom reservoir 134 via apertures 136 and 138 (arrow 218, FIG. 2), completing the cycle.

Returning briefly to FIG. 1, the electric machine 20 includes a terminal block 140 so mounted in the connection compartment 142 as to be in position to receive electric cables (not shown) to power the electric machine 20. Indeed, an oval aperture 144 allows the cables to enter the connection compartment 142. As can be seen from FIG. 5, where the terminal block 140 is removed, a second oval aperture 145 allow electric cable from the terminal block 140 to the coils 28. One skilled in the art will understand that the interconnection between the terminal block 140 and the oval aperture 145 is so sealed that the cooling fluid from the enclosed cooling assembly does not reach the connection compartment 142.

A cover (not shown) is designed to close up the connection compartment 142. Furthermore, a channel 146 is so configured as to receive a seal, for example in the form of an O-ring (not shown), to ensure that the connection compartment is properly sealed.

One skilled in the art will understand that other pump technologies could be used to pump the cooling fluid of the enclosed circuit and that the pump does not need to be contained in the electric machine 20. Indeed, an external pump could be used while maintaining the enclosed status of the enclosed cooling assembly. This external pump could be mechanically connected to the rotor to rotate therewith or be externally powered to rotate independently of the rotor.

One skilled in the art will also understand that the electric machine provided with an enclosed cooling assembly paired with an open cooling assembly is interesting since it allows the use of a dielectric cooling fluid for the enclosed cooling assembly while keeping the conventional water and ethylene glycol mixture for the open cooling assembly that is used to both cool the stator of the machine and the cooling fluid of the enclosed cooling assembly.

One skilled in the art will also understand that the electric machine provided with an enclosed cooling assembly paired with an open cooling assembly is interesting for integrators since the use of an enclosed cooling assembly does not increase the maintenance required and that, when used in a hybrid vehicle, the conventional cooling assembly of the internal combustion engine can be used to cool the electric machine without major modifications.

It is to be understood that the electric machine provided with an enclosed cooling assembly paired with an open cooling assembly is not limited in its application to the details of construction and parts illustrated in the accompanying drawings and described hereinabove. The electric machine provided with an enclosed cooling assembly paired with an open cooling assembly is capable of other embodiments and of being practiced in various ways. It is also to be understood that the phraseology or terminology used herein is for the purpose of description and not limitation. Hence, although the electric machine provided with an enclosed cooling assembly paired with an open cooling assembly has been described hereinabove by way of illustrative embodiments thereof, it can be modified, without departing from the spirit, scope and nature thereof.

The following numbered clauses are offered as further description:

1. An electric machine including:
    a casing;
    a stator;
    a rotor generally coaxial with the stator;
    an enclosed cooling assembly circulating a first cooling fluid within the casing; and
    an open cooling assembly through which a second cooling fluid can flow; the second cooling fluid cooling both the stator and the first cooling fluid.

2. An electric machine as recited in clause 1, wherein the casing includes an external wall, an intermediate wall and an internal wall adjacent to the stator; the enclosed cooling assembly including at least one first cooling path provided between the external wall and the intermediate wall where the first cooling fluid may circulate; and the open cooling assembly including a second cooling path provided between the intermediate wall and the inner wall where the second cooling fluid may circulate; whereby the second cooling fluid cools both the stator and the first cooling fluid.

3. An electric machine as recited in any one of the preceding clauses, further comprising a pump so configured as to circulate the first cooling fluid within the casing.

4. An electric machine as recited in clause 3, wherein the pump is a gerotor pump.

5. An electric machine as recited in clause 3, wherein the pump is so associated with the rotor as to rotate therewith.

6. An electric machine as recited in any one of the preceding clauses, wherein the enclosed cooling assembly includes a relief valve.

7. An electric machine as recited in any one of clauses 1, 3, 4, 5, or 6, wherein the casing includes an external wall, an intermediate wall and an internal wall.

8. An electric machine as recited in clause 7, wherein the enclosed cooling assembly includes a first cooling path provided between the external wall and the intermediate wall of the casing.

9. An electric machine as recited in clause 8, wherein the first cooling path of the first cooling fluid is defined by projections provided on one of the external wall and the intermediate wall and facing the other of the external wall and the intermediate wall.

10. An electric machine as recited in any of clauses 7, 8 or 9, wherein the open cooling assembly includes an inlet, an outlet and a second cooling path provided between the intermediate wall and the inner wall.

11. An electric machine as recited in any one of the preceding clauses, wherein an internal surface of the internal wall receives an external surface of the stator.

12. An electric machine as recited in any one of clauses 2 to 11, wherein the second cooling path is further defined by projections provided on one of the intermediate wall and the internal wall and facing the other of the intermediate wall and the internal wall.

13. An electric machine as recited in any one of clauses 2 to 12, wherein the second cooling path is sealed by first and second O-rings provided between opposite ends of the intermediate and inner walls.

14. An electric machine as recited in any one of the preceding clauses, wherein the casing further includes a slide allowing the first cooling fluid to be directed onto the rotor.

15. An electric machine as recited in clause 14, wherein the rotor includes end plates provided with means for distributing the first cooling fluid onto heads of the coils provided in the stator.

16. An electric machine as recited in clause 15, wherein the first cooling fluid distributing means include a generally U-shaped peripheral channel accumulating a quantity of the first cooling fluid before distributing the first cooling fluid onto the coil heads.

17. An electric machine as recited in clause 15, wherein the longitudinal end plates include means for preventing the first cooling fluid to be trapped in the rotor.

18. An electric machine as recited in any one of clauses 3 to 5, wherein the pump further comprises means for filtering impurities in the first cooling fluid.

19. An electric machine as recited in any one of the preceding clauses, wherein the first cooling fluid is a dielectric fluid.

20. An electric machine as recited in any one of the preceding clauses, wherein the second cooling fluid includes ethylene glycol.

21. An electric machine as recited in any one of the preceding clauses, wherein the first cooling fluid is also used to lubricate bearings provided between the rotor and the casing.

22. A hybrid vehicle provided with a traction motor defined by the electric machine according to any one of the preceding clauses.

What is claimed is:

1. An electric machine, comprising:
a casing;
a stator;
a rotor generally coaxial with the stator;
an enclosed cooling assembly circulating a first cooling liquid within the casing;
an open cooling assembly through which a second cooling liquid can flow, wherein the second cooling liquid is different from the first cooling liquid; and
a pump rotationally coupled to the rotor and including an outlet that flows the second cooling liquid to a first cooling path in the enclosed cooling assembly, wherein the first cooling path includes a plurality of projections that at least partially circumferentially extend around the enclosed cooling assembly;
wherein the second cooling liquid cools both the stator and the first cooling liquid.

2. The electric machine as recited in claim 1, wherein:
the casing includes an external wall, an intermediate wall, and an internal wall adjacent to the stator;
the enclosed cooling assembly includes the first cooling path provided between the external wall and the intermediate wall where the first cooling liquid may circulate;
the open cooling assembly including a second cooling path provided between the intermediate wall and the internal wall where the second cooling liquid may circulate; and
the second cooling liquid cools both the stator and the first cooling liquid.

3. The electric machine as recited in claim 1, wherein the first cooling liquid is a dielectric fluid and the second cooling liquid includes ethylene glycol.

4. The electric machine as recited in claim 3, wherein the pump is a gerotor pump.

5. The electric machine as recited in claim 3, wherein the pump is so associated with the rotor as to rotate therewith.

6. The electric machine as recited in claim 1, wherein the enclosed cooling assembly includes a relief valve.

7. The electric machine as recited in claim 1, wherein the casing includes an external wall, an intermediate wall and an internal wall.

8. The electric machine as recited in claim 7, wherein the enclosed cooling assembly includes a first cooling path provided between the external wall and the intermediate wall of the casing.

9. The electric machine as recited in claim 8, wherein the first cooling path of the first cooling liquid is defined by projections provided on one of the external wall and the intermediate wall and facing the other of the external wall and the intermediate wall.

10. The electric machine as recited in claim 7, wherein the open cooling assembly includes an inlet, an outlet, and a second cooling path provided between the intermediate wall and the internal wall.

11. The electric machine as recited in claim 10, wherein an internal surface of the internal wall receives an external surface of the stator.

12. The electric machine as recited in claim 10, wherein the plurality of projections provided on one of the intermediate wall and the internal wall and facing the other of the intermediate wall and the internal wall.

13. The electric machine as recited in claim 10, wherein the second cooling path is sealed by first and second O-rings provided between opposite ends of the intermediate and internal walls.

14. The electric machine as recited in claim 1, wherein the casing further includes a slide allowing the first cooling liquid to be directed onto the rotor.

15. The electric machine as recited in claim 14, wherein the rotor includes a plurality of longitudinal end plates provided with a structure to distribute the first cooling liquid onto heads of the coils provided in the stator.

16. The electric machine as recited in claim 15, wherein the structure to distribute the first cooling liquid includes a generally U-shaped peripheral channel accumulating a quantity of the first cooling liquid before distributing the first cooling liquid onto the heads of the coils.

17. The electric machine as recited in claim 15, wherein the plurality of longitudinal end plates include a pressure relief mechanism configured to prevent the first cooling liquid from being fluid to be trapped in the rotor.

18. The electric machine as recited in claim 3, wherein the pump further comprises a structure configured to filter impurities in the first cooling liquid.

19. The electric machine as recited in claim 1, wherein the first cooling liquid is a dielectric liquid.

20. The electric machine as recited in claim 1, wherein the second cooling liquid includes ethylene glycol.

21. The electric machine as recited in claim 1, wherein the first cooling liquid is also used to lubricate one or more bearings provided between the rotor and the casing.

\* \* \* \* \*